Figure 1:
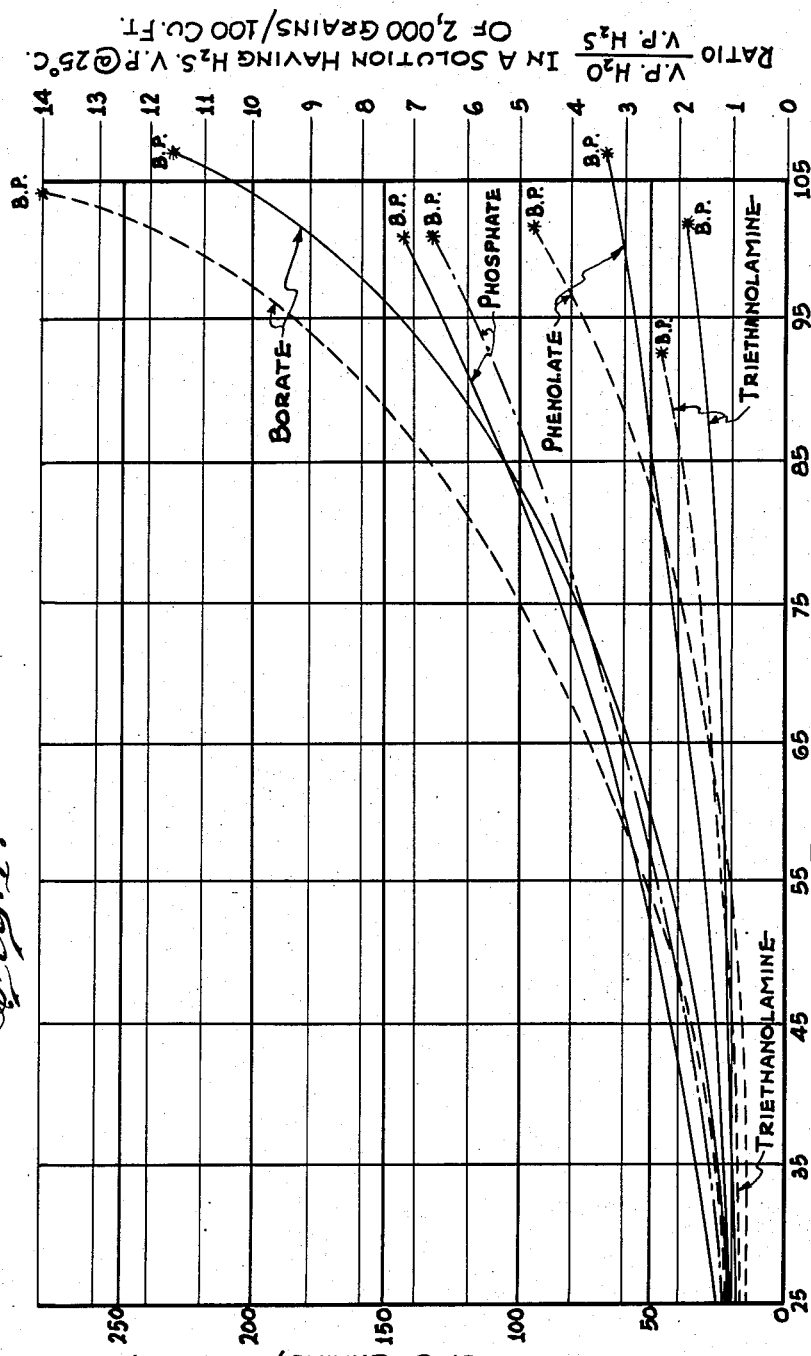

Patented May 20, 1941

2,242,323

UNITED STATES PATENT OFFICE 2,242,323

GAS PURIFICATION PROCESS

Alfred R. Powell, Pittsburgh, Pa., assignor to Koppers Company, a corporation of Delaware Application June 9, 1939, Serial No. 278,285

3 Claims. (Cl. 23—2)

The present invention relates to processes for separating such weakly acidic constituents as hydrogen sulphide, or the like, from mixtures thereof with gases or vapors by means of absorptive solutions that are continuously recycled sequentially between an absorption step for the hydrogen sulphide and a regeneration step for said solutions, and is more especially concerned with improvements in the solution-regeneration steps for such of the processes as effect regeneration of their spent scrubbing solutions by means including heating and boiling or, in other words, restore the absorptive power of their spent scrubbing solutions in so-called "hot-actification."

A number of cyclic processes have been proposed and employed for separating hydrogen sulphide and similar weakly acidic gases from gases and vapors containing them by use of alkaline scrubbing solutions comprising products of reactions between alkali-forming metals and substances that in aqueous solutions exhibit acidic characteristics of minor degree. For example, known compounds that in aqueous solutions have demonstrated their suitability for use in gas purification processes of the above-stated class are alkaline solutions of phenol and substituted derivatives thereof, borates, phosphates, carbonates, and the amino and imino derivatives of aliphatic acids such as alanine, glycocoll, and the like. Somewhat similar results have also been obtained by similarly employing such uncombined and relatively non-volatile alkalis, as suspensions of magnesium hydroxide or aliphatic derivatives of ammonia, for example triethanolamine and similar compounds.

During the absorption steps of these cyclic purification processes, previously regenerated aqueous scrubbing solution is brought into contact with the gases or vapors to be treated, hydrogen sulphide present therein being absorbed by the solution in consequence of its reaction with the alkaline reagent of the solution. In those solutions wherein the alkali is combined with a weakly acidic body such as phenol, boric or phosphoric acids, the reactions of absorption are accompanied by liberation of a weakly acidic constituent or component from its alkali combinations. During the solution-regeneration step of these cyclic processes, scrubbing solution that has passed through the absorption step, is heated to its boiling point either by direct or indirect contact with steam that serves not only as means to heat the solution but may also be employed as a source of "sweep-gas" for flushing from the treating vessel previously absorbed hydrogen sulphide which is liberated from the scrubbing solution by the rise in temperature, this phenomenon being accompanied by a recombination of the acidic with the alkaline constituents which promotes the efficacy of this treating step. The "sweep-gas" is a necessary element of these processes because the partial pressure of the liberated hydrogen sulphide even above the heated, spent scrubbing solution is inadequate to liberate significant quantities of itself from the treating vessel.

The "sweep-gas" may be an extraneously derived non-condensible fluid, in which case the hydrogen sulphide will leave the process step in highly diluted form, or it may preferably have its origin in a portion of the aqueous constituent of the solution by its conversion into steam or vapor during the boiling thereof. In the latter instance, the evaporated water can be advantageously condensed from the mixture of hydrogen sulphide and water vapor and substantially pure hydrogen sulphide be thus recovered for further disposition. For example, it may be compressed and bottled or be burned and converted into sulphuric acid.

Because of the relatively low partial pressure of hydrogen sulphide above the spent scrubbing solutions, even when the latter are raised to temperatures as high as their boiling points at atmospheric pressure, the mixture of steam and hydrogen sulphide discharged from the solution-regeneration step is predominantly the former, the quantity of steam required either passing through or boiling out of the spent solution in order to restore the same to substantially its original absorptive capacity being many times the volume of hydrogen sulphide carried with it.

One of the principal items of operating cost for purification processes of this class is the outlay for the energy required to produce the steam demanded for "sweep-gas" purposes.

An object of the present invention is to provide novel and effective improvements for those installations of liquid-purification processes of the above-stated class that have access to high-pressure steam for their steps of solution-regeneration whereby satisfactory regeneration, of the said spent scrubbing solutions can be effected with requirements of such steam that are importantly reduced from those needed in prior operating procedures.

Another object of the present invention is the provision, for liquid-purification processes of this class, of such practical innovations in operating conditions as will make practical, for certain of their applications, the eliminations of expensive features of apparatus such as heat-exchangers, coolers, and the like, heretofore deemed indispensable.

A further object of invention is the provision of such new and novel method of utilizing the forms of energy available in the high-pressure steam usually employed in the actification of spent scrubbing solutions that advantageous performing of the absorption and the actification steps of cyclic purification processes of the stated type can be carried out in a practical manner without substantial differences of temperature therebetween, and with costs for energy that are commercially practical. The invention has for further objects such other improvements and such other operative advantages or results as may be found to obtain in the processes or apparatus hereinbefore described or claimed.

As above indicated, the energy (usually in the form of high-pressure steam) that is required for regeneration of spent scrubbing solutions according to the prior art, is utilized to bring about two different physical effects, the one being simply the elevation of the temperature of the spent solution to that at which it is to be regenerated and the other being solely the production of the "sweep-gas," usually steam, that serves to flush out the actifier apparatus hydrogen sulphide liberated therein by the raising of the temperature of the spent solution, or by any other preferred means.

Investigations into the distribution of the total energy consumed in this step of these processes have confirmed the anticipated fact that more heat is required to heat the spent solution as the temperature of regeneration is raised. Recent studies of vapor pressure relationships in the vapors and gases effluent to the actifier have however surprisingly revealed that the partial pressure of water-vapor increases more rapidly with increase in temperature than does the vapor pressure of the liberated hydrogen sulphide, and that the preponderance of water vapor to hydrogen sulphide becomes very great from a temperature about 20° C. below and up to the boiling points of the spent solutions at atmospheric pressure. This means that as the temperature of actification is increased in the direction of their boiling points at atmospheric pressure, larger and larger quantities of steam must be evaporated to form "sweep-gas" for the removal of a given weight of hydrogen sulphide from spent solutions flowing through the step of their regeneration. In other words, it has now been found that with increase of temperature at which the spent absorptive solutions are boiled, the ratio of water vapor to hydrogen sulphide increases in notable disproportion.

At a boiling point of approximately 65–70° C., the increase in the water-vapor to hydrogen-sulphide ratio, as shown in the accompanying curves, which will be more fully discussed hereinafter, becomes abruptly rapid for some of the known reagents. It is therefore obvious that if regeneration of spent absorptive solutions is carried out at 100° C. or thereabouts as practised by the prior art, i. e. the boiling points of the aqueous scrubbing solutions at atmospheric pressure, there is a very significant increase in the energy required for flushing a given weight of hydrogen sulphide out of spent scrubbing solutions over that required for the same purpose at lower temperatures because of the markedly greater requirement of energy that goes for the development more especially of the larger amounts of flushing steam involved.

High-pressure steam is normally available in plants where hot-actification liquid-purification processes are used and this medium is ordinarily employed as the source of energy for promoting the regeneration of their spent solutions.

The said investigations further revealed that substantial savings in such high-pressure steam can be effected while achieving substantially the same degree of spent-solution regeneration if, departing from the practice of the prior art, wherein the available energy of the said high-pressure steam was all converted into heat, its energy component which is suitable therefor, is converted into useful mechanical work instead of into heat, and if such resulting mechanical work is then employed for the production of a partial vacuum wherein the spent solutions can be boiled at temperatures of the order of 60–70° C. and if the effluent steam from such energy-conversion step is employed for the heating of the spent solutions and for the production of those importantly reduced requirements of "sweep-gas" that are adequate for their thus reduced boiling range. Obviously, then, for any given spent scrubbing-solution and high-pressure steam employed, the most favorable economic results will be obtained with the use of that quantity of high-pressure steam whose effluent from the step of its conversion to mechanical work is just able to heat the spent solution to that boiling temperature and to supply that "sweep-gas" required at the degree of vacuum which is producible by the mechanical work recovered from the original high-pressure steam. Ordinarily, such a balance will be obtained at boiling temperatures of 60° C. or thereabouts.

According to the present invention therefore, for those spent liquid-purification solutions that depend for the efficacy of their regeneration steps on the evaporation of a liquid which thereafter functions as a "sweep-gas" for flushing from contact with the spent solutions previously absorbed gases liberated from combination therewith during such regenerative steps, the step of evaporation of said liquid being optionally followed by vapor condensation in a subsequent process step, regeneration of the spent solutions is effected at those less-than-atmospheric pressures that correspond to boiling temperatures for the spent solutions of not less than about 40° C. nor more than 80° C. and preferably approximately within the range of about 60°–70° C., such conditions being establishable with optimum conversion of the forms of energy found in their ordinarily available sources. The advantages accruing from the improved conditions of solution-regeneration provided by the present invention are based on the hereinabove disclosed observation that significantly less "sweep-gas" is required for flushing a given weight of hydrogen sulphide from a spent solution at moderate temperatures than at temperatures closer to their normal boiling points, as will be more fully appreciated from a discussion of the accompanying curve sheet, a fact making the mechanical work recoverable from high-pressure steam of greater value in creating the vacuum necessarily employed at moderate temperatures of regeneration than is the case where such energy is utilized merely for heating of the spent solutions.

The absorptive capacity depends on the regeneratability of a scrubbing solution and both are determinative of the practicability of a purification process employing it. Prior practice has in general been based on the concept that the greater the difference between the temperature of the absorption step and that obtaining in the actification step, the greater is the capacity of a given volume of scrubbing solution to absorb hydrogen sulphide. Recognition of the above-given and heretofore unappreciated factors whereby hot-actification of spent liquid-purification scrubbing solutions can be effected with important saving of steam, or otherwise expressed, whereby greater effectiveness of a given quantity of steam can be realized in the regenerative step, has contributed the additional advantages of generally increasing the utility of hot-actification processes by making it economically feasible to perform the absorption step at relatively high temperatures and also advantageously to carry out both the absorption and the actification steps at substantially the same moderately high temperature; the latter type of operation might appropriately be termed "isothermal" operation.

The fact that the improvements of the present invention now make it possible to perform the absorption step at relatively high temperatures and with practical consumption of steam in the regeneration step, has an especially important application in the removal of hydrogen sulphide from such constituents as the gases or vapors or both issuing, for example, from the cracking stills employed in the petroleum industry and from which it is frequently desirable to remove hydrogen sulphide, and the like, without precipitating therefrom those vapors that condense at the more moderate temperature and which are preferred to be carried into subsequent process steps in vaporous form. This goal now becomes in practice attainable because a practical degree of absorption of hydrogen sulphide can be effected at such elevated temperatures as 50°–60° C, or thereabouts.

Furthermore, by making it feasible to operate both the absorption step and the regeneration step of a hot-actification liquid-purification process at substantially the same relatively moderate temperatures, the improvements of the instant invention eliminate the necessity of supplying intermediately of the said process-steps any of the previously employed extensive and expensive heat-exchanger means or cooling equipment, thereby greatly simplifying the structural requirements of such processes and without increasing the costs of energy for solution regeneration beyond those economically permissible.

Figure 2:
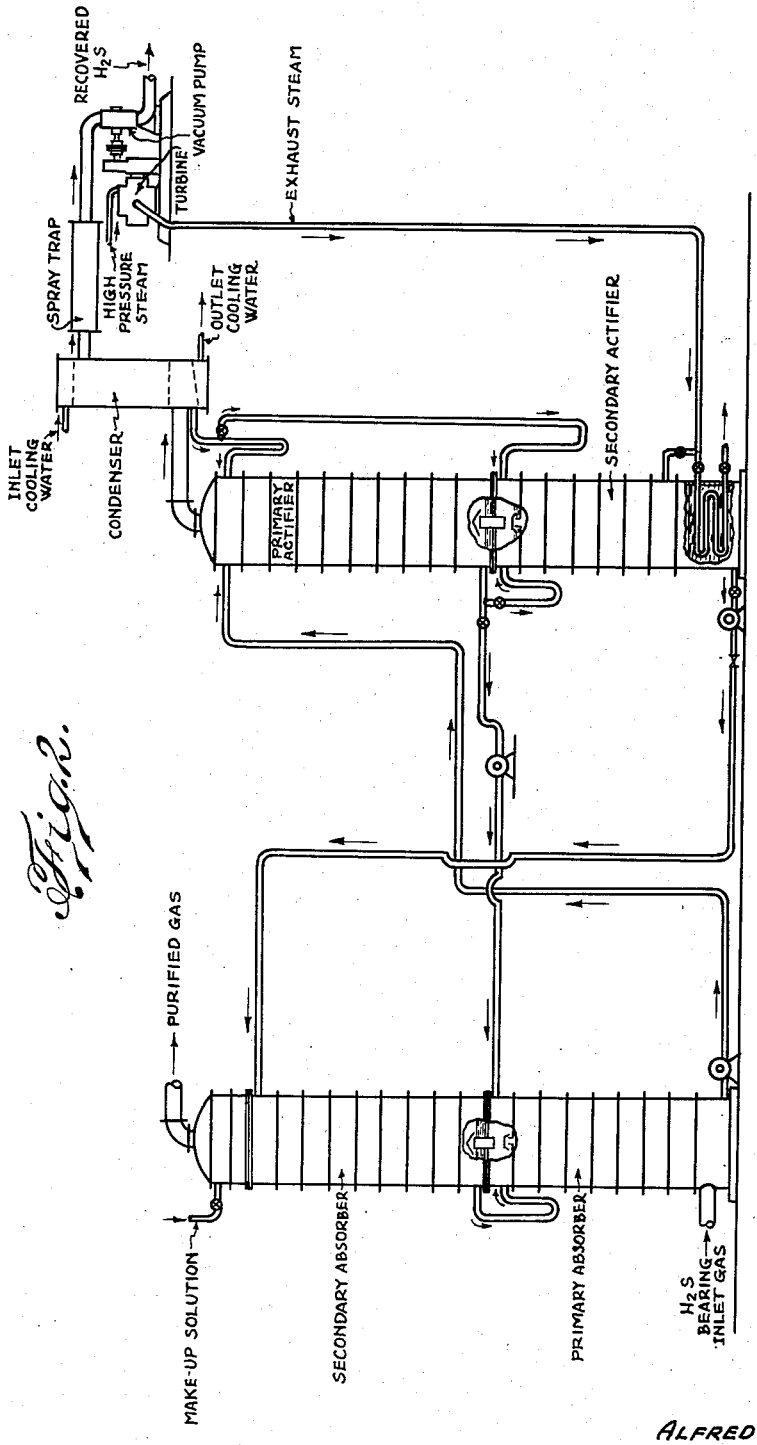

On the drawings, Fig. 1 is a curve sheet representing the water-vapor to hydrogen sulphide ratios; and Fig. 2 is a diagrammatic view of apparatus for practicing the process with successive contact of separate portions of absorbent liquid in both the absorption stage and in the regeneration stage.

On the accompanying curve-sheet, Fig. 1, the curved lines represent, at divers temperatures, the water-vapor to hydrogen-sulphide ratios above aqueous solutions of four representative reagents that are employed for the removal of hydrogen sulphide from gases and vapors and which solutions, when spent, are regenerated accordingly as above-described, the solid lines representing the water-vapor to hydrogen-sulphide ratios above such solutions of the indicated reagents as have at 25° C. a partial pressure of the latter thereabove equivalent to 80 grains per 100 cu. ft. in the mixture of gases and vapors whereas the curved dotted lines represent the said ratios above such of the indicated solutions as have a hydrogen-sulphide partial pressure at 25° C. equal to 2000 grains per 100 cu. ft. As clearly represented on said curve-sheet, temperatures of the scrubbing solutions are plotted on its horizontal axis and along the left-hand vertical axis there is indicated water-vapor to hydrogen-sulphide ratios for the solid curved lines whereas along the right-hand vertical axis, the said ratios are for the curved dotted lines.

Examination of the curves evidences the hereinbefore stated novel fact that, above the illustrated representative aqueous solutions, the ratio of partial pressures of water-vapor to hydrogen-sulphide increases disproportionately with increase of temperature and whether or not the said solutions have a relatively low content of hydrogen sulphide, such as is represented by those containing only sufficient of that constituent to exert a vapor pressure of 80 grains per 100 cu. ft. at 25° C., or have a much higher content thereof, such as will exert a vapor pressure of 2000 grains per 100 cu. ft. at 25° C. All of which means that, if it is desired to remove gaseous hydrogen sulphide from contact with such solutions containing it by employing, for example, the therewith associated water vapor as the flushing agency, the higher the temperature at which such step is performed the greater the amount of water that must be evaporated to remove a given weight of the hydrogen sulphide. Let is be assumed that it is desired to remove, by boiling, hydrogen sulphide from a borate solution that contains 2 moles $H_3BO_3$ and 1.5 moles of KOH per liter and has a hydrogen-sulphide vapor pressure of 80 grains per 100 cu. ft. at 25° C. As illustrated graphically by the accompanying curves, when such solution is boiled at a temperature of 45° C. there issues from the treating vessel a mixture of gases and vapors containing 30 times by volume as much water vapor as hydrogen sulphide; when, however, the boiling point of the said borate solution is raised to 95° C. by increasing the pressure thereon, for example, the issuing mixture of gases and vapors will contain approximately 142.5 times by volume as much water vapor as hydrogen sulphide; at its boiling point of about 107° C. under atmospheric pressure, the ratio of water vapor to hydrogen sulphide will be about 230. That is, 7.67 times as much water vapor must be provided to flush a given weight of hydrogen sulphide from the borate solution at 107° C. as at 45° C. This circumstance obtains not only for relatively low concentrations of hydrogen sulphide in the spent solution but also extends through higher concentrations thereof. For example, if hydrogen sulphide is added to the said borate solution until it exerts a vapor pressure of 2000 grains per 100 cu. ft. at 25° C., or 25 times that in the preceding example, there is required, if the solution is boiled at 45° C., 1.75 of its volume of water-vapor to sweep a unit volume of hydrogen sulphide out of the solution; at 95° C. the required volume of water vapor is increased to 9.25 times that of the hydrogen sulphide removed; and at its boiling point at atmospheric pressure, the required volume of water vapor must be increased to 14 times that of the hydrogen sulphide removed. At its boiling point under atmospheric pressure then, this latter solution requires 8 times as much steam for "sweep-gas" purposes as is required at a boiling point of 45° C.

The illustrated curves further show that a similar relationship but to somewhat lesser degree also obtains for the cited phosphate solution that contains 2 moles $K_3PO_4$ per liter and also for the sodium phenolate solution containing 3.6 moles of NaOH and 4.5 moles of phenol per liter. The said phosphate solution in its steam requirements lies intermediate the solutions of sodium phenolate and potassium borate.

Further examination of the accompanying curves shows that at temperatures of about 60°–70° C., the requirements in water-vapor for "sweep-gas" purposes increase sharply for the class of scrubbing solutions of which the above-mentioned are representative, so that for those instances where energy costs are significant, it is highly important to regenerate these solutions at least within ranges of temperature below those represented by sharp inclination of the said curves.

Boiling the spent scrubbing solutions at the indicated desirable moderate temperatures is simply performed by thus treating them while they are under the influence of the proper degree of vacuum. The development and maintenance of such vacuum requires of course the expenditure of energy either in the form of steam, electrical current, or the like, and the expense therefor is additive to the cost of producing the necessary "sweep-gas," but recognition of the utility of the hereinabove stated phenomenon upon which the improved operating procedure of the present invention is based; namely, the fact that hydrogen sulphide can be removed from spent scrubbing solutions with less "sweep-gas" at lower temperatures than at higher ones, and which fact in turn makes that energy component of steam which is convertible into mechanical work of greater effect in producing a vacuum for solution regeneration than when such component is utilized for its simple solution-heating effect alone, now makes it possible to choose such vacuum and temperatures for boiling the said spent solutions that the total expense of the steam for heating the to-be-regenerated solutions and for developing the necessary "sweep-gas" and conditions of vacuum, is importantly reduced from those costs for energy when actification is carried out by boiling the spent solutions at atmospheric pressure.

This important contribution to the art of spent-solution regeneration has not only been demonstrated to be of great practical utility in processes now operating on a commercial basis but also brings into competition therewith known other reagents that have not been considered commercially feasible because of the high steam-consumption requirements in the regeneration of their spent solutions when such process step was performed at atmospheric pressures. This fact is visibly substantiated by again referring to the accompanying curve-sheet on which it can be seen that the considerable advantages of the some of the reagents in respect of others as to their "sweep-gas" requirements at their boiling points under standard atmospheric pressures, are to a great extent eliminated when their boiling points are reduced to temperatures of 60°–70° C. Thus, the present improvement reduces divers reagents to energy-requirements for actification that for most practical purposes are of the same order of magnitude; and furthermore, it has been demonstrated that the rather inconsiderable advantages that will remain for some of the reagents even at a boiling range of 60°–70° C. are substantially entirely removed if actification within substantially this said boiling range is carried out in combination with the method of so-called "split circulation," which will be hereinafter described and is the patented invention of another.

The above-stated circumstance that reagents of importantly diverse "sweep-gas" requirements, at normal boiling points of their solutions, become comparable in this respect at about the preferred actification-temperatures of the invention, is especially apparent in the cases of reactive solutions of phosphates and borates. An active solution of the borates containing sufficient hydrogen sulphide to exert a vapor pressure thereof amounting to 2000 grains per 100 cu. ft. at 25° C. requires, at its boiling point under standard atmospheric pressure, about twice as much energy for the evaporation of the condensible "sweep-gas" to remove a given weight of hydrogen sulphide from the solution as is the case with an effective solution of the phosphates having the same vapor pressure of hydrogen sulphide. When, however, these solutions are actified in a partial vacuum sufficient to permit their boiling at 60°–70° C., there is little practical difference between their requirements of energy for "sweep-gas" and the choice therebetween would devolve upon some other characteristic such as the cost of reagent, availability, process losses, and the like.

Although the indicated preferred boiling range for spent liquid-purification solutions according to the present improvement is 60°–70° C., it is not desired to limit the claimed invention to such specific range because as will now be evident to all experienced in the art considerable advantage will accrue from employing temperatures somewhat above and below the said preferred range. However, at boiling temperatures much below 40°–45° C. the energy costs for maintaining the high vacuum become so excessive as to nullify the advantage of lesser "sweep-gas" requirements and at boiling temperatures much above 80°–85° C. the potentialities of the improvement are not expediently utilized.

At the preferred boiling range an optimum economy of energy for regeneration purposes is obtained because, within such temperature range, the exhaust steam from a pump adequate to maintain the necessary vacuum, is sufficient to supply the total steam for the "sweep-gas" required at the preferred temperature-range.

As already stated, the advantages accruing from the instant invention are still further enhanced by employing it in combination with that method for absorption and for actification of spent liquid-purification solutions from such absorption, which is set forth in Shoeld U. S. 1,971,798, issued August 28, 1934, wherein it is provided that both the absorption step and the actification step be performed in stages according to the so-called method of "split-circulation" which stipulates that, in the said absorption step, the to-be-treated gases and vapors are flowed in sequence respectively through a stage thereof wherein they are washed with a relatively rapidly circulated portion of the scrubbing solution having a relatively high vapor pressure of hydrogen sulphide and thereafter through a stage wherein the said gases and vapors which have been somewhat reduced in the hydrogen sulphide content, are washed with another portion of the scrubbing solution that is circulated less rapidly and with a lower vapor pressure of hydrogen sulphide than in the previous stage, and which further stipulates that, in the actification step, the total quantity of fresh "sweep-gas" employed therein is first flowed through only a portion of the spent absorptive solution to highly actify it for use in the latter stage of the absorption step, said "sweep-gas" thereafter being flowed through the remainder of said spent solution to actify the same to a lesser degree for use in the first stage of the absorption. In other words, in the "split-circulation" method of operation the larger part of the to-be-absorbed hydrogen sulphide in the foul gases and vapors is absorbed in a large portion of the solution that is actified to a lesser degree, and from which it is easily liberated, whereas the remainder is absorbed in a smaller portion of the scrubbing solution that is extensively actified and from which it is less easily liberated. For this reason, in the actification step that scrubbing solution portion which is to be more highly actified is first brought into contact with the "sweep-gas" when it is clean and has its highest flushing capacity.

Amongst the incidental advantages of the present improvement is the restriction in losses of the absorption reagents through side reactions brought about by the lower temperature of actification, thereby reducing the expenditure for their replacement.

The benefits to be derived from performing the "hot-actification" of spent liquid-purification solutions according to the present procedure, will be better appreciated by comparison of the amounts of steam necessary to provide the same degree of process-efficiency in the case of an absorptive solution that is representative of the class and which is employed under identical conditions of operation to treat the same mixture of gases and vapors, but with the exception that the conditions of solution-regeneration are altered as below indicated. The comparison follows:

*Example No. 1*

A high-sulfur coke-oven gas containing 1000 grains of hydrogen sulphide per 100 cu. ft. is scrubbed at the rate of 24,000,000 cu. ft. per day at a temperature of 25° C. with an absorptive solution for hydrogen sulphide containing the reaction products of sodium hydroxide, phenol, and carbon dioxide to the amount respectively of 155, 91 and 25.6 grams per liter of scrubbing solution. Thirty per cent. of the sodium hydroxide is in the form of sodium carbonate. The outlet gas from the absorption step contains 50 grains per 100 cu. ft. of hydrogen sulphide. The sodium phenolate solution is recirculated at the rate of 8 gallons per 1000 cu. ft. of treated coke-oven gas, when a single stage was employed in both the absorption and actification steps; the actified solution returned to the absorption step contains 3300 grains of hydrogen sulphide per gallon and the spent solution 4500 grains thereof per gallon. The actifier-outlet gases are 80% $H_2S$ and 20% $CO_2$.

When the operating conditions were changed from single stage in both process steps to double stage (split circulation), that portion of the scrubbing solution recirculated in less highly regenerated conditions was sent through the actifier at the rate of 9.2 gallons per M cu. ft. treated coke-oven gas at the same time the relatively highly regenerated portion was circulated at the rate of 3.3 gallons per M cu. ft. of treated gas.

The following summarized tabulation of operating results indicates how the water-vapor to hydrogen-sulphide ratio in the gases and vapors that are outlet to the actifier is affected by either individually or in combination changing the boiling-temperature of the spent solution and altering the method (split-circulation) of its recirculation in both the absorption and actification steps of the purification process.

| | Single-stage in both the absorption and actification steps | | Two-stages (split-circulation) in both the absorption and actification steps | |
|---|---|---|---|---|
| | Spent solution boiled at atmospheric pressure (108° C.) | Spent solution boiled at 60° C. (about 25.3" Hg vac.) | Spent solution boiled at atmospheric pressure | Spent solution boiled at 60° C. (about 25.3" Hg vac.) |
| $H_2S$ in hot vapors from the actifier, grains per cu. ft. | 19 | 5.3 | 35 | 11 |
| Total steam at 150 lbs. sq. in. (gage) required in the actification step of the cyclic process for reducing coke-oven gas from 1000 to 50 grains of $H_2S$ per 100 cu. ft. under the indicated conditions of actification, lbs. per M cu. ft. of treated gas. | 21.2 | 16.1 | 11.1 | 7.2 |
| Gage pressure of 150 lbs./sq. in., steam at outlet of vacuum pump, lbs. sq. in. (gage) | | 75 | | 20 |

It will be observed from the above tabulation that the actual hydrogen sulphide content of the actifier-effluent gases is much less per cubic foot of vapors at 60° C. than at boiling point of the solution at atmospheric pressure. However, this seeming anomaly is of course in consequence of the fact that a cubic foot of water vapor at the lower boiling temperature is much less dense than at the boiling point under atmospheric pressure and, on a weight basis, a given quantity of steam will make many times the volume of "sweep-gas" at 60° C. than would result therefrom at temperatures near the normal boiling point of water.

The above tabulation sets forth the results of experience in the use of the reagent, sodium phenolate, as a medium for absorbing hydrogen sulphide from the stated gas and shows that the same degree of spent-solution regeneration can be obtained with 75% of the steam that is required at atmospheric pressure, if the solution is boiled in a vacuum corresponding to a boiling temperature therefor of 60° C. as provided by the innovations of the present invention; if the vacuum actification at 60° C. is employed in combination with recirculation of the absorptive solution according to the so-called "split-circulation" method, the weight of steam required for the same degree of solution regeneration can be still further reduced to 33% of that quantity necessary when the spent solution is actified at atmospheric pressure with single stages in the absorption and regeneration steps.

Referring again to the accompanying curve-sheet, it will be noted that with the illustrated absorptive solution, which contains 50% by volume of triethanolamine, the water-vapor to hydrogen-sulphide ratios at the atmospheric boiling-points, and whether or not the hydrogen-sulphide content of the spent solutions is the greater or the lesser of the hereinbefore indicated amounts, are of the order of one-sixth to one-seventh of those obtaining in the case of the potassium-borate absorptive solution having the same hydrogen sulphide concentration. This means that substantially 6 to 7 times as much "sweep-steam" will be required for actification in the case of the borate solution as would be employed for the one comprising triethanolamine when regenerating both solutions at atmospheric pressure.

However, in the following second specific example, illustrative of the advantages provided by the instant improvement, comparisons of operating data resulting from the scrubbing of the same hydrogen-sulphide-bearing gas clearly show that, with the combination of "split-circulation" method of recirculation of the absorptive solutions and with their regeneration at a boiling temperature reduced from that obtaining at atmospheric to 65.5° C., there is no difference in the quantity of steam required for the actification of the ethanolamine or borate solution, which means that any advantage of the former in respect of steam consumption has been thus eliminated. Furthermore, the following example is also illustrative of the herein-provided improvement that with actification effected at substantially reduced temperatures of boiling, i. e., in partial vacuum, the absorption and the regeneration steps can be adequately carried out at identical temperatures (isothermal operation), thereby eliminating the necessity of providing heat-exchanger or cooling means between the said latter and former steps. This feature is of particular importance in those instances where it is desired to treat hydrogen-sulphide-bearing gases while maintaining them at moderately elevated temperatures.

|  | Triethanolamine 50% aqueous solution by volume | Aqueous solution of potassium borate as hereinabove described |
|---|---|---|
| Temp. of absorption, °C | 65.5 | 65.5 |
| Temp. of actification, °C | 65.5 | 65.5 |
| Inlet $H_2S$, grains/100 cu. ft | 8000 | 8000 |
| Outlet $H_2S$, grains/100 cu. ft | 200 | 200 |
| Percent $H_2S$ removed | 97.5 | 97.5 |
| Primary absorber, No. plates | 5 | 5 |
| Secondary absorber, No. plates | 5 | 5 |
| Primary actifier, No. plates | 14 | 14 |
| Secondary actifier, No. plates | 10 | 10 |
| Primary solution, gal./M cu. ft | 111 | 108 |
| Secondary solution, gal./M cu. ft | 77 | 29 |
| Total steam for actification, lb./M cu. ft. gas | 41 | 41 |

In order to make more clearly apparent the important economy of actification-steam furnished by the reduced boiling-point feature of the invention, there is given the following table of steam consumption which records operating results obtained with other conditions of operation kept substantially the same, i. e., the same gas was treated with the same relative volumes of absorption solution circulated in the two stages of both process-steps, with the exception that the absorption was performed at 25° C. and the spent solutions were boiled at atmospheric pressure, instead of at 65.5° C. in a partial vacuum. (The total number of plates in the actifier remains the same but their disposition is altered slightly as between triethanolamine and borate operation.)

|  | Triethanolamine | Borate |
|---|---|---|
| Primary stage actification, No. plates | 10 | 12 |
| Secondary stage actification, No. plates | 14 | 12 |
| Steam required for actification, lb./M cu. ft. | 97 | 145 |

These operating data and results for the two sets of conditions in this specific example, upon comparison, surprisingly show that with the combination of the method of split-circulation of the scrubbing solution through both process-steps and of the instant improved method of boiling the spent scrubbing solution at moderate temperatures in partial vacuum has the effect of decreasing the actification-steam consumption from 97 and 145 lb./M cu. ft., respectively for the triethanolamine and borate reagents, to 41 lb. per M cu. ft. for each, while at the same time obtaining the same efficiency of hydrogen sulphide removal from the treated gas and, in spite of the fact that the lesser steam consumption is obtained under temperature conditions of absorption and actification (isothermal operation) which would ordinarily be considered less favorable for efficient operation. As hereinbefore pointed out, this possibility of "isothermal operation" has the important practical and economic advantage that expensive heat exchangers and coolers heretofore required, between the actifier and the absorber, can be dispensed with.

Isothermal operation is not practical much below about 45° C. because at such temperatures the power required for boiling the spent solutions becomes excessive and more than cancels any saving obtained in the simplified equipment and low steam consumption at moderate temperatures thereabove.

It is not intended that the inference be drawn from the above that the possibility of eliminating heat exchangers and coolers from the apparatus for purification plants of this type is the primary advantage resulting from the instant invention because, for example in those applications thereof employing operating conditions such as obtain in the Example No. 1, i. e., where vacuum actification at a temperature higher than the temperature of absorption obtains, such equipment must be included in the structure of the apparatus.

The present invention has been perfected more especially for such plants, employing purification processes of the class herein dealt with, as have available high-pressure steam, and has been especially designed to increase the effectiveness, for such processes, of steam of a type from which power is recoverable. It is of course obvious that the present improvement would be of relatively negligible merit for those installations where adequate quantities of relative valueless low-pressure or exhaust steam are available for heating the spent solutions, because little economic advantage would result. However, wherever the low-pressure steam must be augmented by the use of high-pressure steam (for example, steam at 150–200 lb. pressure), the herein-described improvement provides means whereby the quantities thereof required to be purchased, can be significantly reduced from those necessarily used when operating according to prior practice. It is further obvious that the power recoverable from high-pressure steam to produce the necessary vacuum can in certain instances be preferably substituted for by cheaper electrical energy, without departing from the spirit of the invention, while effecting the heating of the spent solutions by means of cheap low-pressure or exhaust steam.

The improvements in operating results of the instant invention constitute an important contribution to that art of removing weakly acidic gases, such as hydrogen sulphide from gases and vapors containing it, by means of absorptive solutions which are regenerated by means including the flowing through their spent solutions of more especially a condensible "sweep-gas," because the present improvements advantageously and economically reduce a variety of known reagents that have a great diversity of heat requirements for their regeneration when they are employed according to prior art, to substantially a common level in respect of their requisite, thereby eliminating the previously accepted advantages of some of the known reagents in respect of others as to this important consideration.

The invention as hereinabove set forth is embodied in particular form and manner but may be variously embodied within the scope of the claims hereinafter made.

I claim:

1. In regeneration of the spent absorptive solution of a cyclic process for removing hydrogen sulphide from mixtures thereof with gases and vapors by means of an alkaline solution comprising a reagent having a phenolic group in its constitution, the said regeneration being effected by boiling the spent solution while flowing through the same condensible aqueous sweep-vapors that exhibit with decreasing temperature a decreasing ratio in respect of their partial pressures to that of gaseous hydrogen sulphide above the spent solution, the improvement comprising boiling the spent solution at a temperature between about 80° C. and about 40° C., establishing that vacuum on the solution, which is required to reduce the boiling point to the degree for boiling the spent solution at the temperature selected within said range, maintaining the vacuum by high pressure steam so that the low pressure steam effluent of the high pressure steam, left over after producing the vacuum, is substantially sufficient to meet the requirements for boiling and sweeping the solution, and supplying substantially all of both the heat required for boiling the regenerating solution and the condensible aqueous sweep-vapors required for its regeneration, at the selected boiling temperature, from the low pressure steam effluent of the high pressure steam required to establish the vacuum.

2. In the regeneration, by means of energy derived from higher-pressure steam, of spent absorptive solution produced in a cyclic process for removing hydrogen sulphide from mixtures thereof with gases and vapors, said absorptive solution comprising a reagent that combines with the absorbed hydrogen sulphide to give a spent solution above which the ratio of the partial pressure of gaseous hydrogen sulphide to that of an aqueous condensible sweep-vapor flowed therethrough during the regeneration step tends to increase as the temperature of boiling is reduced below that obtaining at atmospheric pressure, the improvement comprising, in combination: boiling the spent solution under vacuum at temperature between about 60° C. to 70° C.; introducing into energy-conversion means suitable therefor a quantity of higher-pressure steam adapted to establish conditions of vacuum and producing thereby a vacuum on the spent solution at which the solution will boil at said temperature, and effecting the aforesaid boiling of the solution and flow of aqueous sweep-vapor through the same with the effluent steam from said energy-conversion means.

3. In a cyclic process comprising an absorption step for removing hydrogen sulphide from mixtures thereof with gases and vapors by means of an alkaline solution comprising a reagent having a phenolic group in its constitution, and a regenerative step comprising flowing through the spent solution condensible sweep-vapors that exhibit with decreasing temperature a decreasing ratio in respect of their partial pressures to that of gaseous hydrogen sulphide above the spent solution, the improvement comprising, in combination: boiling spent absorptive solution at a temperature between 60° C. to 70° C. while under vacuum reducing its boiling to about that temperature; flowing aqueous condensible sweep-vapors into successive contact with separate portions of spent absorptive solution and effecting thereby degrees of regeneration of said solution-portions to successive lesser extent in the absorption step; flowing said hydrogen-sulphide-bearing mixture of gases and vapors into inversely successive contact with the regenerated solution-portions; introducing higher-pressure steam into means for employing energy contained therein to establish the aforesaid vacuum conditions of pressure above the spent absorptive solution; withdrawing steam of reduced energy-content from said energy-employing means and utilizing it to supply the heat for boiling the spent absorptive solution and for developing condensible sweep-vapors flowed therethrough during its regeneration.

ALFRED R. POWELL.